UNITED STATES PATENT OFFICE.

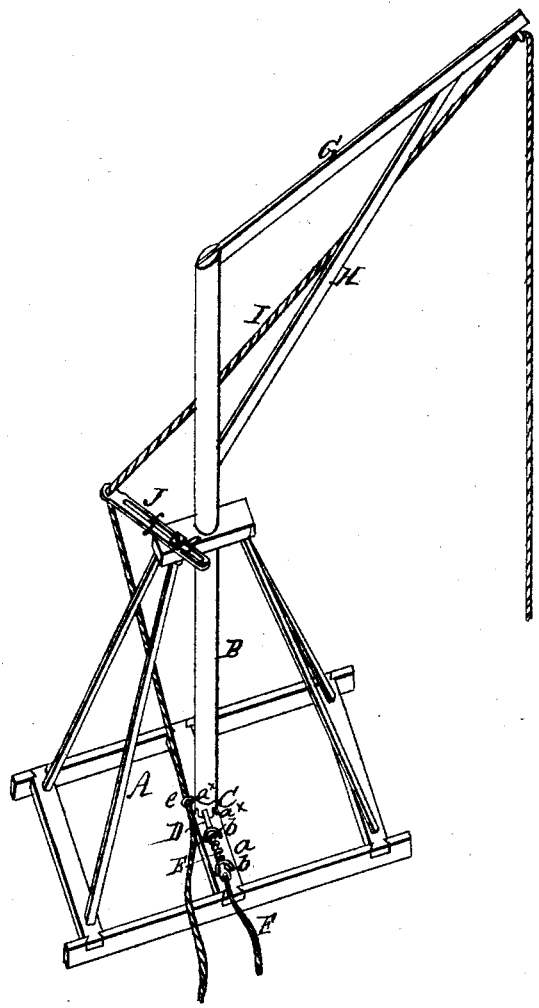

SETH TURNER, OF ONARGA, ILLINOIS.

IMPROVED DERRICK.

Specification forming part of Letters Patent No. 45,445, dated December 13, 1864.

*To all whom it may concern:*

Be it known that I, SETH TURNER, of Onarga, in the county of Iroquois and State of Illinois, have invented a new and improved derrick for elevating hay, grain, &c., for loading, stacking, or mowing the same; and I do hereby declare that the following is a full, clear, and exact description thereof, which will enable others skilled in the art to make and use the same, reference being had to the accompanying drawing, forming part of this specification.

The drawing represents a perspective view of my invention.

This invention relates to a new and improved derrick, arranged in such a manner that it may revolve, and provided with a fork, tackle, spring, and guide, as hereinafter fully set forth, whereby the hay or grain may be elevated to any desired height and then swung around over the stack, rick, cart, or mow, and discharged, and the empty fork then lowered, to be again loaded, elevated, and discharged.

A represents a framing, constructed in any proper manner to insure strength with lightness, and B is a shaft, which is placed vertically in the framing A, its lower end being stepped in a cross-piece, $a$, at the bottom of the framing, the shaft being allowed to rotate freely in the latter.

At the lower end of the shaft B there is a metal ferrule, C, which is notched at suitable and equal distances apart, as shown at $a^\times$, and D is a rod, which is fitted in guides $b$, on the cross-piece $a$, and has a spiral spring, E, upon it, said spring having a tendency to keep the rod D pressed toward the ferrule C. The rod D has a cord, F, attached to it.

To the upper end of the shaft B there is attached an oblique or inclined rod, G, which is braced by a bar, H, and I is a rope, which runs through a sheave or pulley at the outer end of G, said rope passing through the outer end of an adjustable arm, J, on the top of the framing A, and through a guide, $e$, on the cross-piece $a$, near the lower end of shaft B.

The arm J is slotted longitudinally, as shown at $f$, and a bolt, $g$, passes through the slot $f$ into the framing. This mode of attachment admits of the arm J being turned or adjusted either to the right or left, and also of being virtually lengthened or shortened, as may be required.

The rope I has a fork at its end. Any of the approved horse hay-forks may be employed. This fork, after being loaded, is elevated by a horse attached to the opposite end of the rope I, and when the fork is elevated to the desired height the operator pulls the cord F, which causes the rod D to be drawn out from one of the notches $a^\times$ in the ferrule C, and the loaded fork is swung around over the stack, rick, cart, or mow, and, the horse being stopped, the operator pulls the trip-cord of the fork, and the hay or grain is discharged. The horse is then backed, the shaft turned back to its original position by pulling on the trip-cord, the rod $d$ being forced by the spring E into a notch $a^\times$ of C, to prevent shaft B from turning. The fork is then lowered, and the operation repeated.

The arm J is adjusted relatively with the shaft B and the place where the hay or grain is to be discharged, so as to prevent the shaft being turned more than the required distance each time the fork is swung around over the place where the load is to be discharged, and by lengthening and shortening the arm J the speed of the turning of shaft B for that purpose may be varied as desired.

I claim as new and desire to secure by Letters Patent—

The rotating shaft B, provided with the oblique arm G and fitted in the framing A, as shown, in combination with the adjustable arm J and the rod or catch D and the notched ferrule C, or their equivalents, for securing the shaft B, all arranged and used in connection with a horse hay-fork and tackle, substantially as and for the purpose set forth.

SETH TURNER.

Witnesses:
R. A. HUNGERFORD,
M. H. MESSER.